May 19, 1936.  E. GREEN  2,041,467
BIT CLEANER
Filed Nov. 18, 1932   2 Sheets-Sheet 1

INVENTOR.
Ellis Green,
BY
ATTORNEY.

INVENTOR.
Ellis Green,
BY
ATTORNEY.

Patented May 19, 1936

2,041,467

UNITED STATES PATENT OFFICE 2,041,467

BIT CLEANER

Ellis Green, Tulsa, Okla., assignor of one-half to Sara R. Lorraine, San Marino, Calif., and one-half to Walter T. Lundquist, Los Angeles, Calif.

Application November 18, 1932, Serial No. 643,201

15 Claims. (Cl. 255—71)

This invention relates to rotary cone drill bits; and has for its object to provide a continuous and positive cleaning action at the cutter cones during operation of the bit.

More particularly it is an object of the invention to provide the drill bit with cooperating cone cutters having spaced rows of cutting teeth, the cutter cones being adapted for assembly with the spaces between the rows of teeth of the cooperating cones in transverse alinement, and a cleaning element operatively assembled with relation to the cones at said transversely alined spaces for cleaning the teeth of cuttings and the like.

It is a further object of the invention to clean the teeth by scraping action of the cleaning element, and to utilize the rotary movement of the cutter cones for maintaining scraping engagement.

It is a still further object of the invention to adapt the cleaning element for directed discharge of a circulating medium, so as to insure a flushing action immediately adjacent the teeth of the cones.

It is a still further object of the invention to adapt the cleaning element for convenient assembly with relation to the cutter cones, so as to preferably provide both a scraping action and a flushing action at the spaces between the rows of teeth, and at the same time provide for unobstructed removal of cuttings and return flow of the circulating medium.

Further objects of the invention will be readily understood from the following description of the accompanying drawings, in which.

Figure 1:
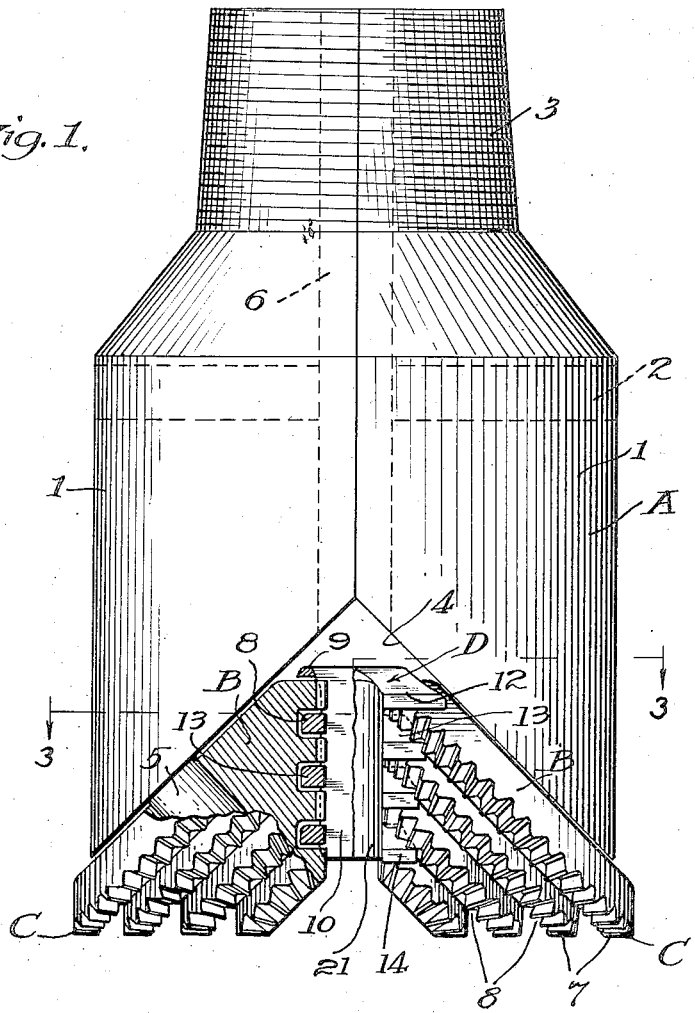
Fig. 1 is a side elevation of a drill bit embodying the cleaning means, and partly broken away in vertical section.

The cleaning device is employed in connection with a drill bit comprising a head A, preferably formed in two halves 1 which are bolted together as shown at 2, and having a usual threaded shank 3. At their lower ends the halves 1 cooperate to form a usual transverse V-shaped groove 4, with preferably right angular cutter cones B journaled on pins 5 which project from the respective walls of the V-groove, so that the opposite sides of each cone respectively extend longitudinally and vertically, with the horizontal sides of the pair of cones forming a horizontal cutting surface C—C, and the vertical sides of the pair of cones transversely spaced as shown in Fig. 1. A usual circulating bore 6 opens through the head A into the groove 4, so that a circulating medium is adapted for discharge past the cutter cones, for carrying cuttings up the side of the drill head.

The cones B are provided with annular rows of cutting teeth 7, with the rows of teeth of each cone spaced by annular grooves 8; and at the transversely spaced vertical sides of the pair of cones the grooves 8 of the cooperating cutters are in transverse alinement as shown in Fig. 1, so that a cleaning element D may be mounted between the vertical transversely spaced sides of the cones, with ribs of the cleaning element preferably extending into the transversely alined grooves.

Figure 2:
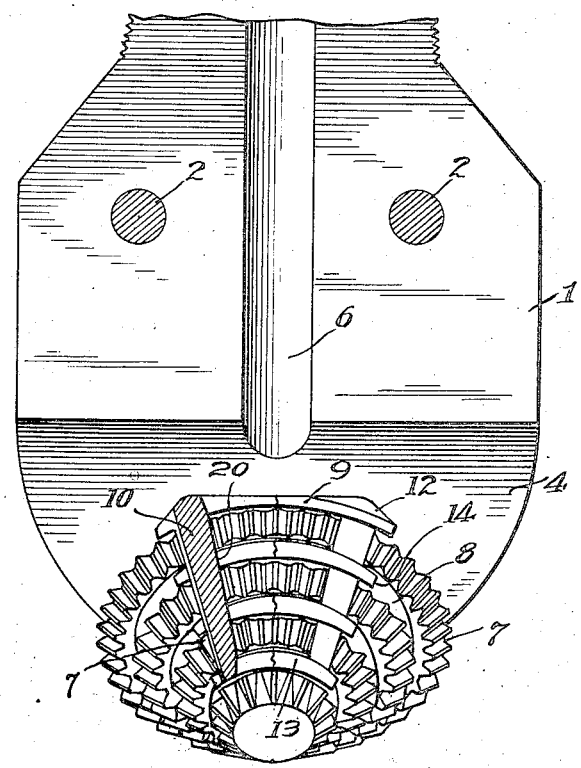
Fig. 2 is a vertical section on the line 2—2 of Fig. 1, with the cleaning element shown partly in elevation and partly in vertical section.
Figure 3:
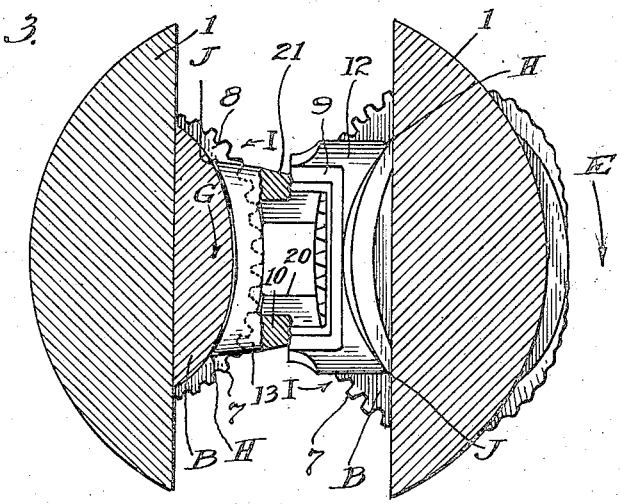
Fig. 3 is a transverse section on the line 3—3 of Fig. 1.

The cleaning element D is preferably an integral structure including a substantially rectangular frame 9, a head 12 overhanging the ends and sides of the frame, end walls 10 depending from the ends of the frame and inclined toward one another as shown in Fig. 2, and a plurality of ribs 13 extending from one end wall to the other at each side of the cleaning element, with the ribs which are at each side of the cleaning element vertically spaced from one another in spaced relation below head 12, and projecting laterally beyond the end walls as shown in Fig. 2. The heads 12 and the ribs 13 are preferably downwardly bowed toward their respective ends as shown in Fig. 2, and their outer edges are preferably concave as shown in Fig. 3. The bowed ribs 13 which are at opposite sides of the cleaning element are in transverse alinement as will be understood by reference to Figs. 1 and 2, the medial portions of the ribs at one side of the cleaning element being shown in vertical section at the left of Fig. 1 and being in transverse alinement with the medial portions of the ribs at the other side of the cleaning element which are shown in front elevation and by dotted lines in back of the teeth 7 at the right of Fig. 1, and the ribs at the front side of the cleaning element as viewed in Fig. 2, being shown in elevation at the right of said figure, directly in front of and therefore transversely alined with the ribs which are at the rear of the cleaning element and the continuations of which are shown at the left of Fig. 2.

This preferred embodiment of the cleaning element is of a size and so proportioned that when mounted between the vertical transversely spaced sides of the cutter cones, the ribs 13 are received in the grooves 8; and suitable means are provided for mounting the cleaning element in operative position by suspending it from a part of the drill bit assembly. In the illustrated embodiment of the invention, the cleaning element is mounted between the cutter cones by its heads 12 resting upon the upper sides of the cones as shown in Fig. 1, thereby supporting the cleaning element between the cooperating cutter cones while adapting the cones for normal rotation when the drill head is rotated. The heads 12 may overlie appreciable areas of the upper sides of cones B so as to support the cleaning element even when the teeth 8 have been appreciably worn away; and the cleaning element is held against lateral displacement by the concave outer edges of ribs 13 engaging the proximate convex bases of grooves 8 as shown at the left of Fig. 3.

The ends of ribs 13 preferably form scraper blades 14 which are urged into intimate contact with the cutter cones, preferably by the rotation of the cones; it being noted that when the drill head is rotated as shown by arrow E in Fig. 3, the cones B are respectively rotated in the directions indicated by arrows F and G, so that the oppositely turning proximate vertical edges of the cones, through their sliding contact with the diagonally opposite scrapers 14 which are indicated at H—H, tend to twist the cleaning element as shown by arrows I, whereby the diagonally opposite scrapers 14 which are indicated at J—J, are pressed into scraping contact with the cones at the bases of their grooves 8.

Cuttings and other extraneous matter tending to clog the cutter cones is thus scraped away as fast as it accumulates, and the cleaning element is so constructed that the circulating medium which is discharged from bore 6 carries away material which tends to clog the cutter cones. This flushing action is obtained as a result of the tapering bore 20, which opens vertically through the cleaning element in alinement with bore 6 as shown in Fig. 2, and which opens laterally through the sides of the cleaning element above each of the ribs 13 as shown in Fig. 1. The circulating medium from bore 6 is thus directed downwardly through bore 20 and also laterally outwardly onto each of the ribs 13 and thence into the grooves 8, thereby flushing the grooves and providing unobstructed circulation, with the circulating medium and the cuttings carried upwardly at the sides of the drill head; and in order to insure unobstructed upward flow of the circulating medium, the outer surfaces of the end walls 10 of the cleaning element are preferably grooved along their vertical length as shown at 21 in Fig. 3.

The invention thus provides practical means for cleaning the cones of a rotary drill bit while the bit is in operation; with the cleaning element suspended from a part of the drill bit assembly and positioned between the cooperating cones of the bit so as to in no way obstruct operation of the bit, and having blades adapted to be urged into scraping contact with the cones for cleaning the teeth, and also providing for unobstructed flow of a circulating medium, with said circulating medium directed against the cones for removing material which tends to clog the cutter cones.

I claim:

1. In combination, a rotary drill bit having cooperating transversely spaced rotary cutters adapted for opposite turning of their proximate edges when the drill bit is rotated, each cutter having annular rows of teeth spaced by an annular groove, and a cleaning element supported so as to extend downwardly between the cooperating cutters and having lateral projections extending into the grooves of the cooperating cutters, opposite sides of the cleaning element also engaging the cutters at their proximate edges whereby said opposite turning of said proximate edges of the cutters tends to twist the cleaning element for urging its lateral projections into the grooves.

2. A cleaning element for a rotary drill bit which has transversely spaced rotary cone cutters provided with annular rows of teeth spaced from one another by annular grooves; the cleaning element comprising a substantially rectangular frame having depending end walls with a head projecting from the sides of the frame at its upper end and a plurality of ribs extending from one end wall to the other at each side of the cleaning element, the head being adapted to rest upon the cutter cones for suspending the cleaning element between the transversely spaced cones, and the ribs at each side of the cleaning element being vertically spaced from one another in spaced relation below the head, the cleaning element having a bore opening vertically therethrough and opening laterally above the respective ribs, and the ribs being downwardly bowed toward their respective ends with the ends of the ribs forming blades and the outer edges of the ribs being concave, adapting the ribs for snug scraping engagement with the respective grooves of the transversely spaced cone cutters.

3. A cleaning element for a rotary drill bit which has transversely spaced rotary cone cutters provided with annular rows of teeth spaced from one another by an annular groove; the cleaning element comprising a member adapted for suspension between the transversely spaced cutters and having a rib at each of opposite sides adapted to extend into the annular groove of the proximate cutter.

4. A cleaning element for a rotary drill bit which has transversely spaced rotary cone cutters provided with annular rows of teeth spaced from one another by an annular groove; the cleaning element comprising a member having a head adapted to rest upon the cutters for suspending the member between the transversely spaced cutters, said member having a rib at each of opposite sides adapted to extend into the annular groove of the proximate cutter.

5. A cleaning element for transversely spaced cutters of a rotary drill bit, comprising a member adapted for suspension between the transversely spaced cutters and having a rib at each of opposite sides projecting toward the proximate cutter, and said member having a bore opening laterally above the ribs.

6. A cleaning element for a cutter comprising a member adapted for suspension alongside the cutter and having a rib projecting toward the cutter, and said member having a bore opening laterally above the rib.

7. A cleaning element for a rotary drill bit which has transversely spaced rotary cone cutters provided with annular rows of teeth spaced from one another by annular grooves; the cleaning element comprising a substantially rectangular frame having depending end walls with a head projecting from the sides of the frame at its upper end and a plurality of ribs extending from one end wall to the other at each side of the cleaning element, the head being adapted to rest upon the cutter cones for suspending the cleaning element between the transversely spaced cones, and the ribs at each side of the cleaning element being vertically spaced from one another in spaced relation below the head, the cleaning element having a bore opening vertically therethrough and opening laterally above the respective ribs.

8. A cleaning element for a cutter comprising a member adapted for suspension alongside the cutter and having a rib projecting toward the cutter, said member having a bore opening laterally toward the cutter.

9. A cleaning element for transversely spaced cutters of a rotary drill bit, comprising a member adapted for suspension between the transversely spaced cutters and having a bore opening laterally toward the respective cutters.

10. A cleaning element for transversely spaced cutters of a rotary drill bit, comprising a member adapted for support at its respective sides on the respective cutters and depending into the space between the cutters and having a rib at each of opposite sides projecting toward the proximate cutter.

11. A cleaning element for transversely spaced cutters of a rotary drill bit, comprising a member adapted for support at its respective sides on the respective cutters and depending into the space between the cutters and having a bore for directing a flushing medium toward the cutters.

12. A cleaning element for transversely spaced cutters of a rotary drill bit, comprising a member adapted for suspension between the transversely spaced cutters and having a rib at each of opposite sides projecting toward the proximate cutter, said member having a bore opening laterally toward the respective cutters.

13. A cleaning element for transversely spaced cutters of a rotary drill bit, comprising a member adapted for suspension between the transversely spaced cutters and having a rib at each of opposite sides projecting toward the proximate cutter.

14. A cleaning element for transversely spaced cooperating rotary cone cutters of a rotary drill bit, comprising a member adapted for suspension between the transversely spaced cutters and having a rib at each of opposite sides, the outer edges of the ribs being concave so as to conform to the contour of the transversely spaced cone cutters.

15. A cleaning element for transversely spaced cooperating rotary cone cutters of a rotary drill bit, comprising a member adapted for suspension between the transversely spaced cutters and having a rib at each of opposite sides, the ribs being downwardly bowed toward their respective ends so as to conform to the contour of the transversely spaced cone cutters.

ELLIS GREEN.